United States Patent [19]
Gregg et al.

[11] Patent Number: 5,422,893
[45] Date of Patent: Jun. 6, 1995

[54] MAINTAINING INFORMATION FROM A DAMAGED FRAME BY THE RECEIVER IN A COMMUNICATION LINK

[75] Inventors: Thomas A. Gregg, Highland; Joseph M. Hoke, Millerton; Albert Ing, Wappingers Falls; Chin Lee, Poughkeepsie, all of N.Y.

[73] Assignee: International Busines Machines Corporation, Armonk, N.Y.

[21] Appl. No.: 286,060

[22] Filed: Aug. 4, 1994

[51] Int. Cl.$^6$ ............................................. G06F 11/00
[52] U.S. Cl. ........................................ 371/32; 371/31
[58] Field of Search ............................. 371/31, 32, 35

[56] References Cited

U.S. PATENT DOCUMENTS

| | | | |
|---|---|---|---|
| 3,646,518 | 2/1972 | Weinstein | 371/35 |
| 4,439,859 | 3/1984 | Donnan | 371/32 |
| 4,970,714 | 11/1990 | Chen et al. | 371/32 |

OTHER PUBLICATIONS

IEEE Transactions on Communications vol. COM-25, No. 5, May 1977, Sindhu, pp. 473–479.

*Primary Examiner*—Roy N. Envall, Jr.
*Assistant Examiner*—Steven R. Garland
*Attorney, Agent, or Firm*—Lawrence D. Cutter

[57] ABSTRACT

A system and method for asynchronously transmitting data across fibers in a serial manner. Frames are provided as a mechanism to transmit associated data serially and tie the data being transmitted to a particular buffer set. Each buffer set maintains a state that keeps track of the progress and sequence of received frames. When transmission errors occur in the frames, the errors may affect only the information field and there is enough information in the header to identify the frame. A request can then be sent back to the other end of the fibers to retransmit the frame. Certain information in the frame header is not used to identify the frame, but is used to control the transfer of frames and identify lost frames. When a frame information field is damaged by transmission errors, this header information is retained by the receiver of the damaged frame. Retaining this information at the receiver of the damaged frame frees the sender for storing it during the transmission of each frame. Freeing the sender improves performance by removing steps for the normal error free transmission of frames.

1 Claim, 10 Drawing Sheets

NO DATA

WRITE

READ

FIG.6

WRITE

READ

FIG. 7

FIG. 8 ORIGINATOR STATE TABLE

| STATES | MRB-A | MRB+A | MRB-A ERR | MRB+A ERR | DATA-A START | DATA+A START | DATA END | DATA ERR | DATA-A ST/ERR | DATA+A ST/ERR |
|---|---|---|---|---|---|---|---|---|---|---|
| IDLE | IDLE$_1$ | DRJM$_5$ | MRJ$_6$ | DHRJ$_{5,6}$ | DS$_2$ | DSA$_2$ | HERR | HERR | DRJ$_{5,7}$ | DRJA$_5$ |
| DS | HERR | HERR | HERR | HERR | HERR | HERR | DE$_3$ | DRJ$_{5,7}$ | HERR | HERR |
| DE | IERR | IDLE$_1$ | IERR | MRJA$_6$ | HERR | IERR | HERR | HERR | IERR | IERR |
| DSA | HERR | HERR | HERR | HERR | HERR | HERR | DEA$_4$ | DRJA$_5$ | HERR | HERR |
| DEA | IERR | DRJM$_5$ | IERR | DRJM$_{5,6}$ | DS$_2$ | DSA$_2$ | HERR | HERR | DRJ$_{5,7}$ | DRJA$_5$ |
| DRJ | IERR | DRJM | IERR | DHRJ$_6$ | DS$_2$ | IERR | HERR | HERR | DRJ$_{5,7}$ | IERR |
| DRJA | IERR | IERR | IERR | IERR | IERR | DSA$_2$ | HERR | HERR | IERR | DRJA$_5$ |
| DRJM | IERR | IERR | IERR | IERR | DSM$_2$ | IERR | HERR | HERR | DRJM$_{5,7}$ | IERR |
| DSM | HERR | HERR | HERR | HERR | HERR | HERR | IDLE$_1$ | DRJM$_{5,7}$ | HERR | HERR |
| MRJ | IDLE$_1$ | IDLE$_1$ | MRJ$_6$ | MRJ$_6$ | IERR | IERR | HERR | HERR | IERR | HERR |
| MRJA | IDLE$_1$ | IDLE$_1$ | MRJA$_6$ | MRJA$_6$ | IERR | IERR | HERR | HERR | IERR | HERR |
| DMRJ | DRJM | DRJM | DMRJ$_6$ | DMRJ$_6$ | DSMRJ | IERR | HERR | HERR | DMRJ$_{5,7}$ | IERR |
| DSMRJ | HERR | HERR | HERR | HERR | HERR | HERR | MRJA | DMRJ$_{5,7}$ | HERR | HERR |

FIG. 9 ORIGINATOR ACTIONS

902— 1) POST 'DONE,' RESET TIMER
2) START DATA TRANSFER
3) DATA TRANSFER COMPLETE
4) DATA TRANSFER COMPLETE, SEND ACK
5) SEND REJ FOR DATA
6) SEND REJ FOR MRB
7) SET 10 MS TIMEOUT

FIG. 10 ORIGINATOR EVENTS

| EVENT | DEFINITION |
|---|---|
| 1002 MRB-A | GOOD MRB RECEIVED W/A=0 |
| MRB+A | GOOD MRB RECEIVED W/A=1 |
| MRB-A ERR | ERROR MRB RECEIVED W/A=0 |
| 1004 MRB+A ERR | ERROR MRB RECEIVED W/A=1 |
| DATA-A START | GOOD DATA LCW RECEIVED W/A=0 |
| DATA+A START | GOOD DATA LCW RECEIVED W/A=1 |
| 1006 DATA END | GOOD END OF DATA RECEIVED |
| DATA ERR | ERROR IN DATA AFTER LCW |
| DATA-A ST/ERR | ERROR DATA RECEIVED W/A=0 (MULTI FIBER) |
| DATA+A ST/ERR | ERROR DATA RECEIVED W/A=1 (MULTI FIBER) |

FIG. 11 ORIGINATOR STATES

| NAME | DESCRIPTION | EXPLANATION |
|---|---|---|
| IDLE | IDLE | DONE, NO REJECTS OUTSTANDING |
| 1102 DS | DATA START | GOOD DATA LCW RECEIVED W/A=0 |
| DE | DATA END | GOOD DATA END RECEIVED (A=0) |
| DSA | DATA START W/A | GOOD DATA LCW RECEIVED W/A=1 |
| DEA | DATA END W/A | GOOD DATA END RECEIVED (A=1) |
| DRJ | DATA REJECT | REJECT SENT FOR DATA (A=0) |
| DRJA | DATA REJECT W/A | REJECT SENT FOR DATA (A=1) |
| DRJM | DATA REJECT, MRB | REJECT SENT FOR DATA (DATA A MUST=0), MRB RECEIVED |
| 1108 DSM | DATA START, MRB | GOOD DATA LCW RECEIVED (DATA A MUST=0), MRB RECEIVED |
| MRJ | MRB REJECT | REJECT SENT FOR MRB (A=0) |
| MRJA | MRB REJECT W/A | REJECT SENT FOR MRB (A=1) |
| DMRJ | DATA, MRB REJECT | REJECT SENT FOR DATA (A MUST=0), THEN FOR MRB (A MUST=1) |
| 1110 DSMRJ | DATA START, MRB REJECT | GOOD DATA LCW REC'VD (A MUST=0), REJECT SENT FOR MRB (A MUST=1) |
| 1104 IERR | INTERFACE ERROR | INTERFACE ERROR |
| HERR | HARDWARE ERROR | HARDWARE ERROR (SHOULD NEVER OCCUR) |
| 1106 | | |

FIG. 12 RECIPIENT STATE TABLE

| STATES | MCB-A | MCB+A | MCB-A ERR | MCB+A ERR | DATA-A START | DATA+A START | DATA END | DATA ERR | DATA-A ST/ERR | DATA+A ST/ERR |
|---|---|---|---|---|---|---|---|---|---|---|
| NULL | IDLE 7 | DSN | IDLE 7 | DSN | IERR | IERR | HERR | HERR | IDLE 7 | IDLE 7 |
| DSN | IERR | IERR | IERR | IERR | DEN | DEN | HERR | HERR | IDLE 7 | IDLE 7 |
| DEN | HERR | HERR | HERR | HERR | HERR | HERR | IDLE 7 | HERR | HERR | HERR |
| IDLE | IDLE 1 | DS 1 | IDLE 6 | MRJ 6 | DEMRJ 6 | DEAMRJ 6 | HERR | HERR | IDLE 6,5 | IDLE 6,5 |
| DS | IERR | IERR | IERR | IERR | DE 2 | DEA 2 | HERR | HERR | DRJ 5 | DRJ 5 |
| DE | HERR | HERR | HERR | HERR | HERR | HERR | IDLE 3 | DS 5 | HERR | HERR |
| DEA | HERR | HERR | HERR | HERR | HERR | HERR | DS 4 | DS 5 | HERR | HERR |
| MRJ | IERR | IERR | IERR | IERR | DEMRJ | DEAMRJ | HERR | HERR | IDLE 5 | IDLE 5 |
| DEMRJ | HERR | HERR | HERR | HERR | HERR | HERR | MRJD | HERR | HERR | HERR |
| DEAMRJ | HERR | HERR | HERR | HERR | HERR | HERR | MRJD | IDLE 5 | HERR | HERR |
| MRJD | IERR | IDLE | IERR | MRJD 6 | IERR | IERR | HERR | HERR | IERR | IERR |
| MRJDA | IERR | DS 4 | IERR | MRJDA 6 | IERR | IERR | HERR | HERR | IERR | IERR |

FIG. 13 RECIPIENT ACTIONS

1) POST MCB AVAILABLE
2) START DATA TRANSFER
3) DATA TRANSFER COMPLETE
4) DATA TRANSFER COMPLETE, SEND ACK
5) SEND REJ FOR DATA
6) SEND REJ FOR MCB
7) SEND MRB INDICATING UNPREPARED BUFFER SET

FIG. 14 RECIPIENT EVENTS

| EVENT | DEFINITION |
|---|---|
| MCB-A | GOOD MCB RECEIVED W/A=0 |
| MCB+A | GOOD MCB RECEIVED W/A=1 |
| MCB-A ERR | ERROR MCB RECEIVED W/A=0 |
| MCB+A ERR | ERROR MCB RECEIVED W/A=1 |
| DATA-A START | GOOD DATA LCW RECEIVED W/A=0 |
| DATA+A START | GOOD DATA LCW RECEIVED W/A=1 |
| DATA END | GOOD END OF DATA RECEIVED |
| DATA ERR | ERROR IN DATA AFTER LCW |
| DATA-A ST/ERR | ERROR DATA RECEIVED W/A=0 (MULTI FIBER) |
| DATA+A ST/ERR | ERROR DATA RECEIVED W/A=1 (MULTI FIBER) |

FIG. 15 RECIPIENT STATES

| NAME | DESCRIPTION | EXPLANATION |
|---|---|---|
| NULL | NULL | BUFFER SET NOT READY, NOT PREPARED |
| DSN | DATA START FOR NULL | GOOD MCB RECEIVED W/A=1, WAITING FOR DATA START FROM NULL STATE |
| DEN | DATA END FOR NULL | GOOD DATA LCW RECEIVED, WAITING FOR DATA END FROM DSN STATE |
| IDLE | IDLE | DONE, REJECTS MAY BE OUTSTANDING |
| DS | DATA START | GOOD MCB RECEIVED W/A=1, WAITING FOR DATA START |
| DE | DATA END | GOOD DATA LCW RECEIVED W/A=0, WAITING FOR DATA END |
| DEA | DATA END | GOOD DATA LCW RECEIVED W/A=1, WAITING FOR DATA END |
| MRJ | MCB REJECT | REJECT SENT FOR MCB(A=1) |
| DEMRJ | DATA-A END, MCB REJECT | GOOD DATA LCW RECEIVED(A=0), WAITING FOR DATA END, REJECT SENT FOR MCB |
| DEAMRJ | DATA+A END, MCB REJECT | GOOD DATA LCW RECEIVED(A=1), WAITING FOR DATA END, REJECT SENT FOR MCB |
| MRJD | MCB REJECT, DATA-A | REJECT SENT FOR MCB, DATA RECEIVED OK |
| MRJDA | MCB REJECT, DATA+A | REJECT SENT FOR MCB, DATA(A=1) RECEIVED OK |

MAINTAINING INFORMATION FROM A DAMAGED FRAME BY THE RECEIVER IN A COMMUNICATION LINK

FIELD OF THE INVENTION

The present invention is generally directed to data communication systems using optical fibers to carry information. More particularly, the present invention is directed to recovering frames of information which have been corrupted during transmission while retaining some of the information from the corrupted frame.

BACKGROUND OF THE INVENTION

Fiber optics have enabled the transmission of long strings of data in a serial fashion from a driver to a receiver over long distances (typically measured in kilometers) at very high data rates (typically specified in billions of bits per second). This is in contrast to more traditional communication over electrical wires which only allow data to be transmitted for relatively short distances at these high data rates. The distances for communication over wire means is typically in the range of several tens of meters.

Fiber optic data transmission is however inherently noisy in that bit errors in the data are frequent. Error rates of one in a trillion or even one in a billion bits are common. Various checking methods including cyclic redundancy codes are used to detect these errors.

Several methods have been suggested for recovering data that has been transmitted but received with error indications. One method is to employ a high level protocol that keeps track of the time from request to response. Each time a request is sent from one side of the fiber optic link to the other, the sender starts a timer. If a response is not received within a specified time, the sender "assumes" that either the request or the response was lost. The sender then requests status from the other end of the link to determine if the request should be resent.

Another method of recovering data received in error is to package the data into frames and to assign a sequence number to each frame. If a receiver detects a frame with a sequence number that is out of order, it assumes that one or more frames were lost. Using the sequence number of the last correctly received frame, the receiver then requests the lost frames to be retransmitted. This method allows multiple requests and responses to be on the link at the same time, thus improving the utilization.

In all of the procedures discussed above, the resent frame always has the same header and information as the original frame with the transmission error. This requires the sender of the frame to store all of the information associated with any frames that may be resent in the future, thus adding to the complexity (and time) of each successful transmission of a frame.

Thus what is needed is a mechanism by which the sender only retains the information field and the minimum header information for frame identification. When a frame is received with a transmission error, the receiver retains the header information so that the sender does not have to resend it. This improves performance of the normal non-error case since the header information is only retained if there is a transmission error.

SUMMARY OF THE INVENTION

The present invention is embodied in a system and method for asynchronously transmitting data blocks between two information handling systems. Two carriers are used to interconnect two systems and to provide serial data transmission in both directions. Together, these carriers and the supporting hardware is called a link. Information fames are provided as a mechanism to transmit data serially on the fiber. A frame contains all or part of the contents of: a request; a response; or a data area.

The protocol for data transmission includes a request sent from one information handling system to another, followed by optional data areas transmitted in either direction, followed by a response sent back to the requesting system. Each sequence of "request, data, and response" is called an operation, and multiple operations may be interleaved over the link. For each operation, strict ordering of the request, data, and response is maintained. The system maintains state information as to the progress of each operation that has originated or to which it is responding. To maintain the state information, the frame headers of the requests and responses include an indicator (the A bit) informing the receiver that data areas are associated with either the request or response.

According to an embodiment of the present invention, when a frame that has been damaged by a transmission error is received, some of the information fields in the header, namely the A bit, are retained by the receiver. The receiver then instructs the other end of the link to retransmit the damaged frame. When the retransmitted frame is received, the receiver ignores certain information in the header and substitutes the information retained from the original damaged frame. Similarly, any field in the header that is not needed to uniquely identify the frame could be retained by the receiver and substituted into the header of the retransmitted frame.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

FIG. 9 is a list of originator actions;

FIG. 10 is a list of originator events;

FIG. 11 is a list of originator states;

FIG. 13 is a list of recipient actions;

FIG. 14 is a list of recipient events;

FIG. 15 is a list of recipient states.

DETAILED DESCRIPTION OF THE INVENTION

Figure 1:
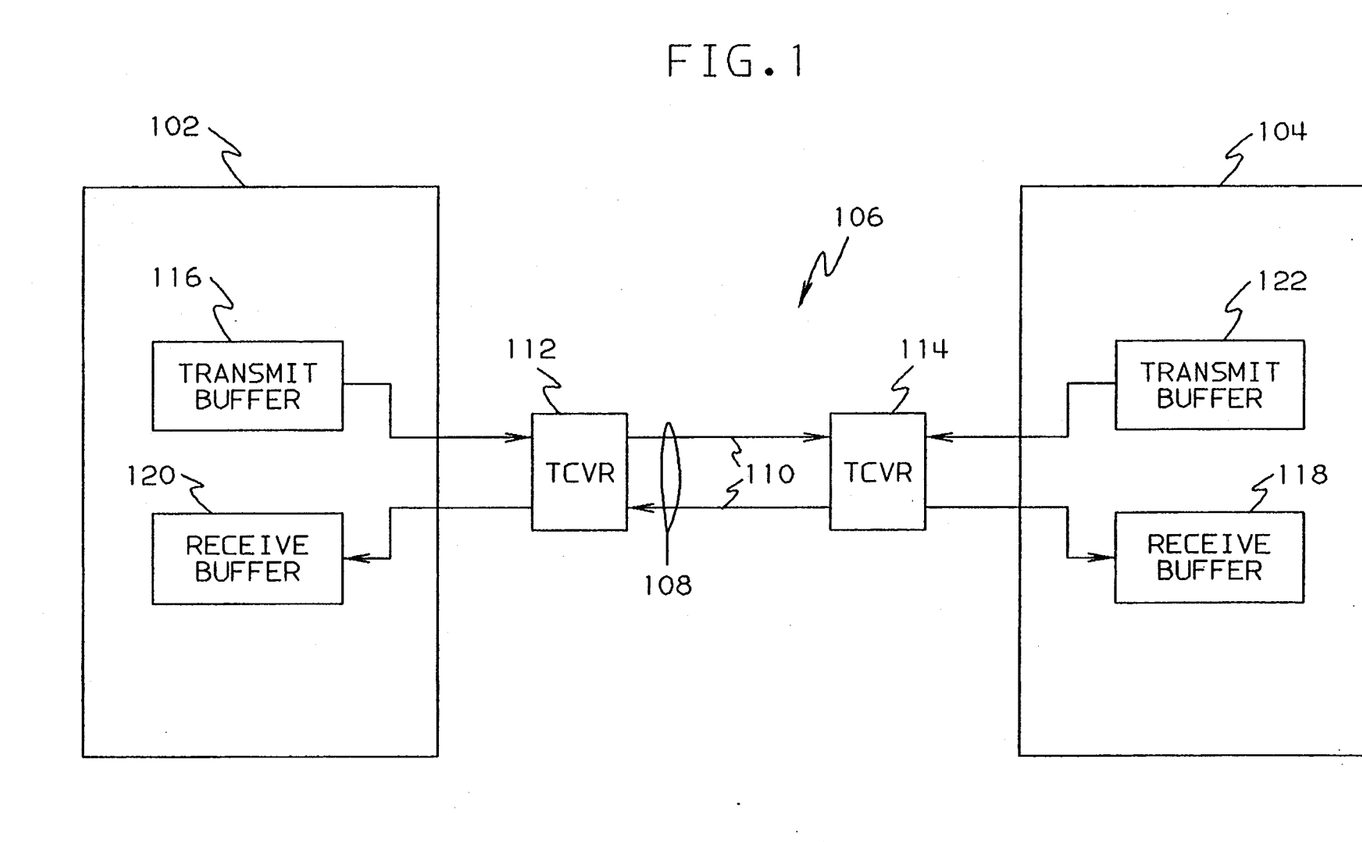
FIG. 1 is a block diagram illustrating a physical link between two information handling elements.

Turning first to FIG. 1, a physical link between two computing elements 102, 104 is illustrated. These elements could be, for example, two computers or a computer and a shared memory device or in general, any information handling system. In any event, computing elements 102, 104 are connected by way of intersystem channel link 106 including fiber optic cable link 108. Fiber optic link 108 is formed with optical fiber cable pair 110. A fiber cable pair includes two optical fibers, one for transmitting information and one for receiving information. Fiber cable pair 110 is coupled to computing elements 102, 104 by way of transceivers (TCVR) 112 and 114 located at opposite ends of the link. Each of the transceivers 112 and 114 includes a transmitter unit and a receiver unit.

All of the data traffic over fiber optic cable link 108 supports message passing between the computing elements 102 and 104. A typical message is a request sent from computing element 102 to computing element 104. Data may be associated with the request and is either sent from computing element 102 to computing element 104 (a write operation) or from computing element 104 to computing element 102 (a read operation). After the data is transferred, a response is sent from computing element 104 to computing element 102. The messages, consisting of requests, data and responses are stored in buffers located in both computing elements as shown. To transfer a request, data, or response transmit buffers 116 and 122 and receive buffers 118 and 120 are employed in computing elements 102 and 104. It should be understood that transmitting buffers 116 and 122 may be located anywhere in the transmitting computing elements 102 and 104, including in main processor storage. It should be further understood that the receive buffers 118 and 120 should at all times be immediately accessible by transceivers 112 and 114. Therefore, receive buffers 118 and 120 are usually implemented as arrays dedicated to the link, and they are not in main processor storage where access is shared among many different elements within computing elements 102 and 104.

Figure 2:
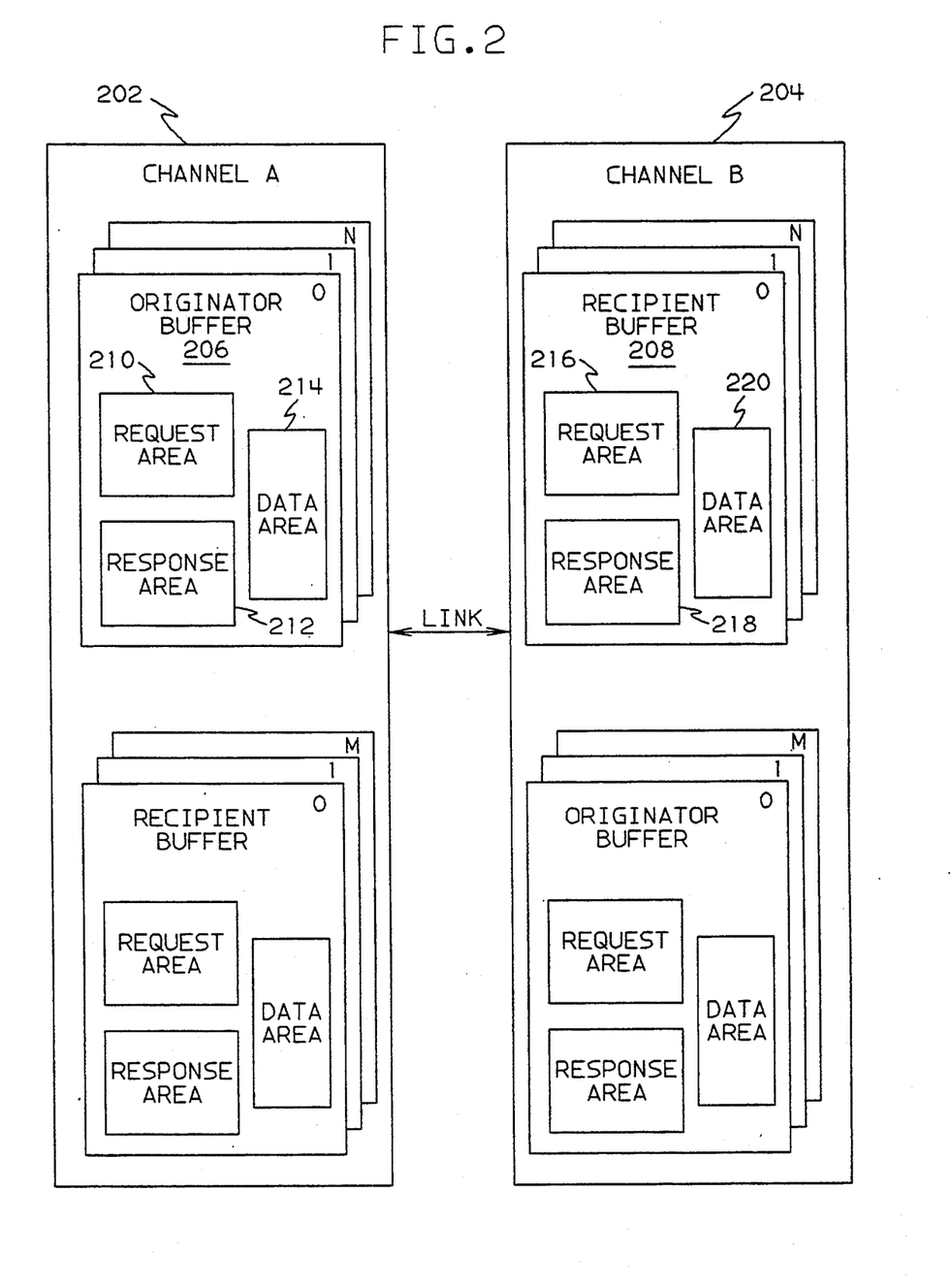
FIG. 2 is a block diagram illustrating a multimessage channel buffer structure.

To process a complete message with data requires buffers in both computing elements 102, 104. The computing element that initiates the message is the originator, and the computing element that processes the message is the recipient. FIG. 2 illustrates a typical situation in which there are multiple buffers on both sides of a link. For example, transmission of a message with data from Channel A (202) to Channel B (204) requires Channel A originator buffers shown in block 206 and the Channel B recipient buffers shown in block 208. Each group of buffers, 206 and 208, are called "buffer sets". When a message is sent, originator buffer request area 210 is loaded with the request, and the request is sent over the link to recipient buffer request area 216. If data is to be transferred, it is either sent from originator buffer data area 214 to recipient buffer data area 220 for write operation, or it is sent from recipient buffer data area 220 to originator buffer data area 214 for a read operation. After data transfer, if any, the response is loaded into the recipient buffer response area 218 and sent across the link to originator buffer response area 212 or vice versa depending on the information flow direction.

The information that is transferred from one side of the link to the other side is contained in frames. This information is always targeted to a particular buffer area, and the targeting information is contained in the link-control word (see below) of the frame. This targeting information allows the frames to be multiplexed over the link in any order. As an example, returning to FIG. 2, Channel A could send a request for buffer set 1 followed by write data for buffer set 0, followed by a response for buffer set 0, etc. It should be understood that a computing element can dynamically set up various numbers of originator and/or recipient buffers depending on the number and type of links to be established.

Figure 3:
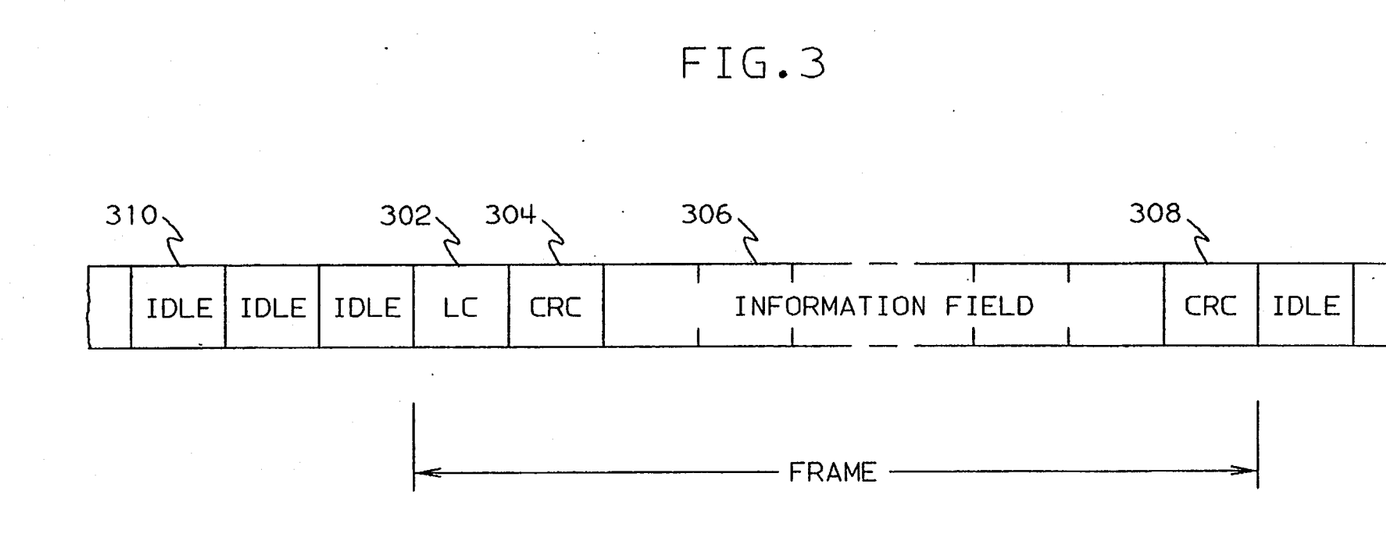
FIG. 3 illustrates the format of an exemplary frame, particularly showing the presence of a link control word.

The format of an exemplary frame is illustrated in FIG. 3. When no frames are being transmitted, idle words 310 are continuously sent on the link. When frames are transmitted, they start with a data word which is the link-control word (LC) 302. Various fields in the link-control word 302 identify the frame format and type, designate a buffer set area, and control the state of the transceiver and link. These fields are described in detail below.

A link-control-CRC (cyclical redundancy check) word 304 preferably follows link-control word 302. Link-control-CRC word 304 is conventionally generated from values in the link-control word. Link-control-CRC word 304 is checked at the receiver to test the validity of the link-control word in the incoming frame.

There are two types of frames: control frames and information frames. Control frames do not have an information field. Control frames consist only of a link-control word and a link-control-CRC word. An information frame has link-control word 302, a link-control-CRC word 304 and an information field 306. Information field 306 contains, for example, from one to 1,024 words. Information field 306 contains the information sent from a buffer set area at one end of the link to a buffer set area at the other end of the link.

An information field is followed by information-field-CRC word 308. Information-field-CRC word 308 is conventionally generated from the values in the information field. Information-field-CRC word 308 is checked at the receiver to test the validity of the information field in the incoming frame.

Figure 4:
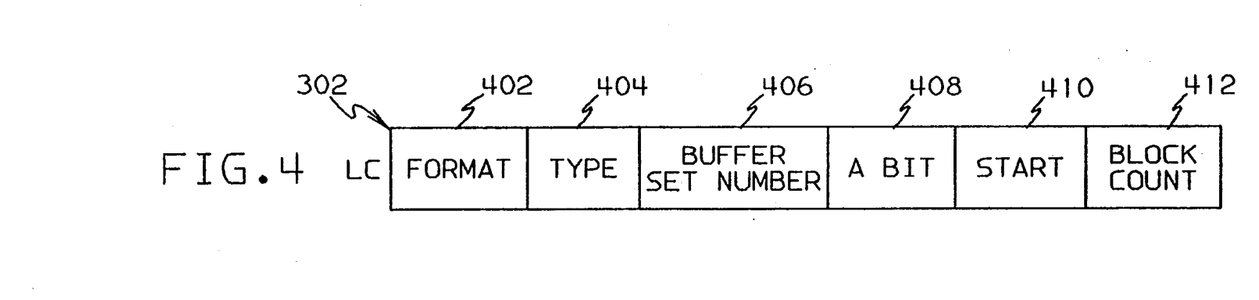
FIG. 4 illustrates the contents of the Link Control word.

FIG. 4 shows details of link-control word 302. Format bit 402 indicates whether or not the frame contains an information field. Requests, responses, and data frames all have an information field while acknowledgements and rejects do not have an information field. Type field 404 specifies that the frame is either a request, a response, or a data frame. Buffer set number 406 specifies which buffer set is the target. "A bit" 408 has two uses. In a request frame, "A bit" 408 is used to indicate that data frame(s) are to follow (a write operation), and in a response frame, the "A bit" is used to indicate that data frame(s) preceded the response (a read operation). In a data frame, the "A bit" is used to indicate that more data frame(s) are to follow.

It should be kept in mind that, as used herein, the terms "data frame" and "information frame" are not synonymous. Requests, responses and data frames are all information frames (that is, frames with an information field). A request is called a Message Command Block (MCB) and a response is called a Message Response Block (MRB) (see FIGS. 5 and 6).

Information transferred to a particular buffer may be contained in more than one frame or frame group. The first frame for a buffer area always has Start 410 bit "ON" and this bit also indicates the validity of Block Count 412. This count indicates the total number of 256 byte blocks that are transferred to the buffer. This count does not indicate the length of the presently transmitted frame. The transmitter can end the frame with a CRC 308 word on any 256 byte boundary of the information 306 field. When the transmitter resumes the transfer to the buffer, it starts the new frame with Start bit 410 in the link-control word reset to zero. The zero value of the start bit indicates that this frame is a continuation of a previous frame targeted to the same buffer. The receiver knows that all of the information has been received when the total number of 256 byte blocks transmitted, in all of the frames, have been received and satisfy Block Count 412, transmitted in the link-control word of the first frame. A buffer area can be transmitted by any number of frames from one to the total number of 256 byte blocks. For example, a 1024 byte buffer area can be transmitted in from one to four frames.

Figure 5:
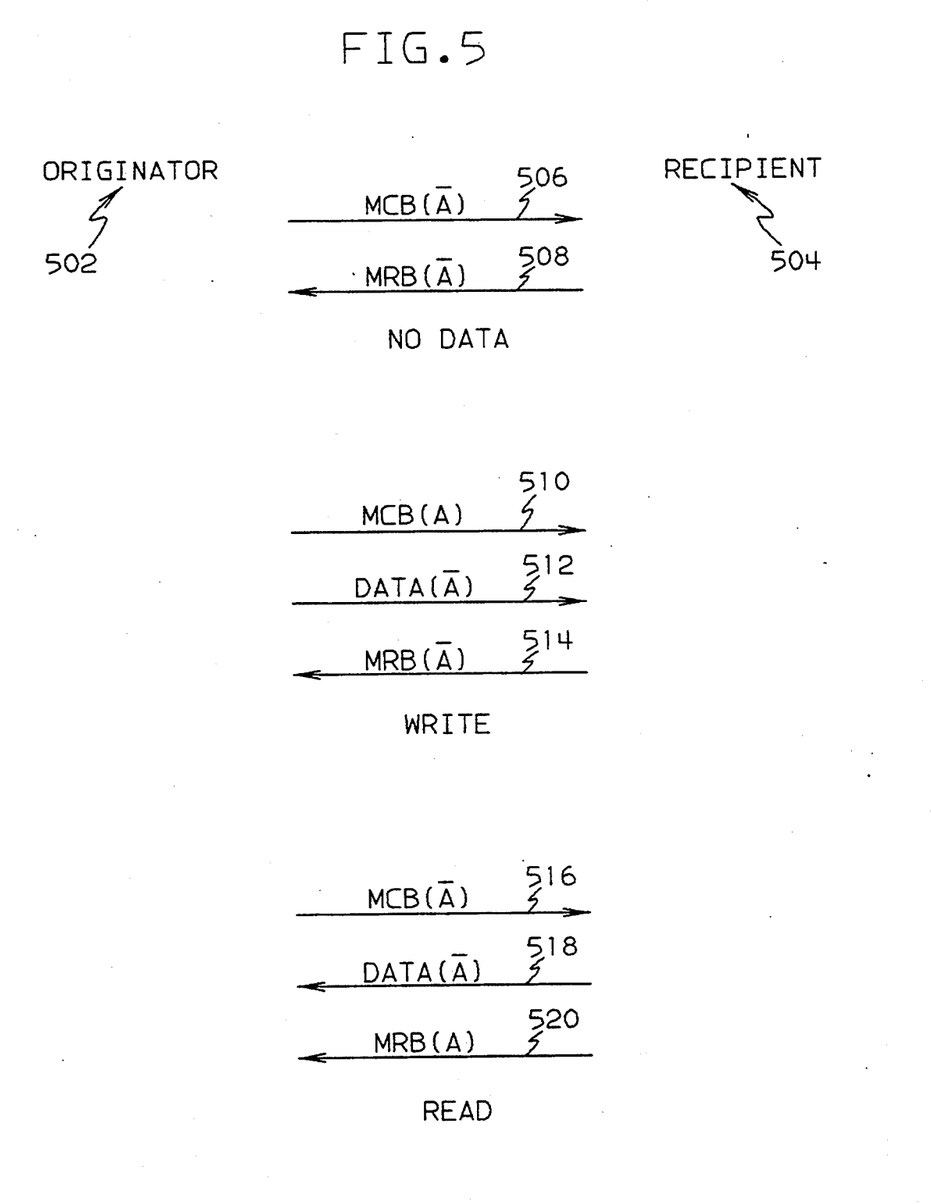
FIG. 5 illustrates sequences of command, data and response exchanged between two computing elements or systems.
Figure 6:
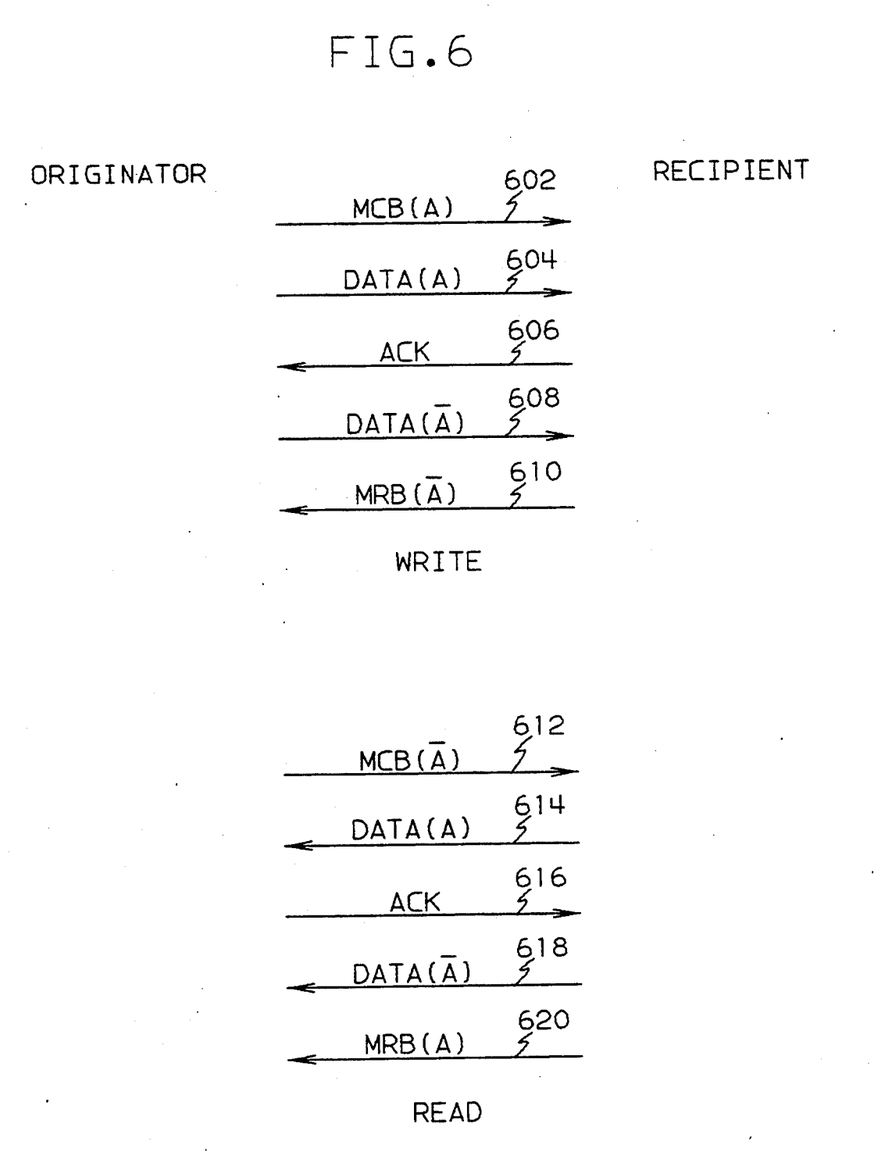
FIG. 6 illustrates additional sequences of command, data and response exchanges where multiple data transfers are performed.

Although not provided with sequence numbers, each frame is interlocked with subsequent and previous frames. The interlocking is accomplished by the protocol on the link. For example, each message for a particular buffer set starts with a request, is followed by data and is subsequently followed by a response. Each of these types of transmissions has a unique link-control word since each transmission is targeted to differing buffer set areas. FIGS. 5 and 6 illustrate the protocols.

FIG. 5 shows three operational examples. The first example shows a request and response with no data transfer. In this example, originator 502 sends a request in Message Command Block (MCB) (in step 506). The LC 302 for this frame has "A bit" 408 set to zero (indicated by the bar over the "A" in the Figure) since there is no data to follow. After the request has been processed, recipient 504 sends a response in Message Response Block (MRB)(508). The LC word for this frame also has the "A bit" set to zero since there was no data preceding the response.

The second example in FIG. 5 is a write of a single data area. In this case, MCB (510) has the "A bit" set to "1" since there is at least one data area to follow. After the MCB, the originator sends the data area DATA (512). The "A bit" in this DATA frame is set to zero because there are no more data areas to follow. After recipient 504 processes the request and its associated data, it sends a response, in the form of MRB (514). The "A bit" in the MRB is set to "0" since there was no data preceding the response.

The third and last example in FIG. 5 is a read of a single data area. In this case, MCB (516) has the "A bit" set to zero since there are no data areas to follow. Recipient 504 processes the request and returns data area DATA (518). The "A bit" in this DATA frame is set to "0" because there are no more data areas to follow. After recipient 504 sends the DATA frame, it sends response MRB (520). The "A bit" in this MRB is set to "1" since there was at least one data area preceding the response.

FIG. 6 shows two examples of transferring multiple data areas. In the first example, a write operation transferring two areas is performed by the originator. As in the single data area example, MCB 602 and first data area 604 are sent by the originator. First data area 604 has the "A bit" set to "1" indicating that more data areas are to follow. The recipient processes the first data area by moving it to main storage (or elsewhere) thus freeing the buffer area for the receipt of the next data area. Next, the recipient sends an acknowledge ACK (606) frame. This frame contains no information field but the link control word identifies the buffer set. The originator responds to the ACK frame by sending the next (and last) data area DATA (608). The "A bit" in this DATA frame is set to "0" because there are no more data areas to follow. After the recipient processes the request and its associated data, it sends a response, an MRB 610. The MRB has the "A bit" off as in the single data area write example.

The second example in FIG. 6 illustrates a read operation transferring two data areas. The originator starts by sending MCB (612). The recipient responds by returning data area DATA (614). The "A bit" in this DATA frame is "ON" indicating that more data areas are to follow. After the originator receives the data area and moves it to main storage, (or elsewhere) the buffer area is free for the receipt of the next data area. The originator sends an acknowledge ACK frame (616). This ACK frame is similar to the ACK frame (606) used in the write case. The recipient responds to the ACK frame (616) by sending the next data frame DATA (618) to the originator. The "A bit" in this DATA frame is off indicating that this is the last data area. After the recipient sends the DATA frame, it sends response frame MRB (520). The "A bit" in this MRB is set to "1" since there was at least one data area preceding the response.

It should be understood that while only one operation for a single buffer set is shown in the examples of FIGS. 5 and 6, multiple buffer sets may be using the link at the same time, and that the traffic on the link consists of interleaved frames sent for the multiple buffer sets.

Figure 7:
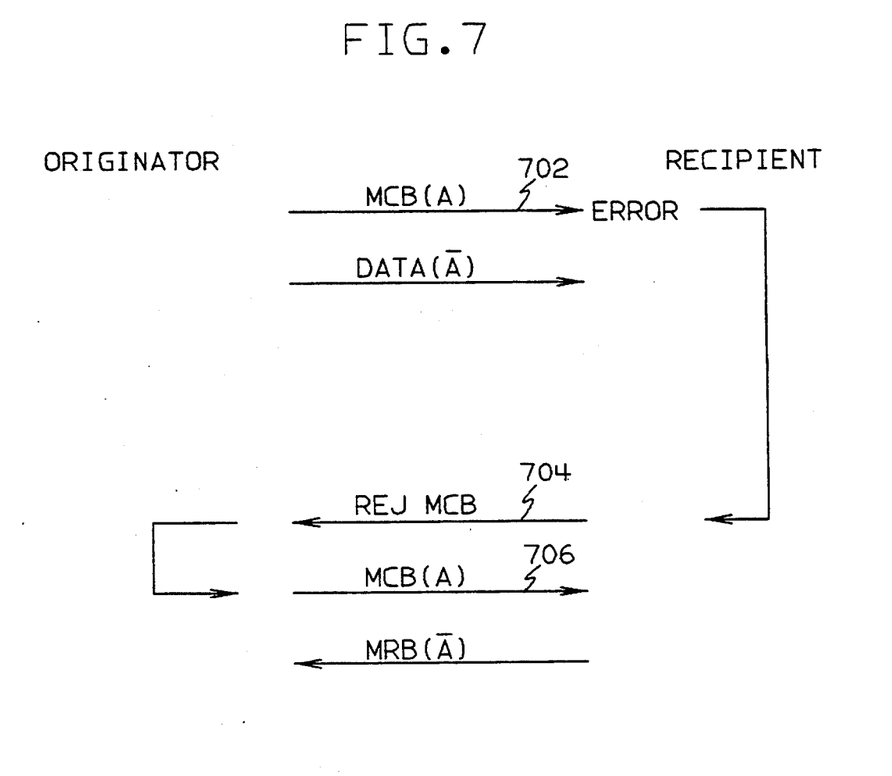
FIG. 7 illustrates an exchange sequence where one of the frames has a transmission error.

Returning to FIG. 3, it is noted that link control word 302 and information field 306 have independent error checking capabilities. This checking is provided by encoding of the data for serial transmission (preferably by using the 8 bit/10 bit code described in U.S. Pat. No. 4,486,739), and the CRC words 304 and 308. Transmission errors usually affect only a few bits at a time and it is unlikely that a transmission error would damage both the LC and the information field in the same frame. If the link control word is in error, the entire frame is considered lost since the receiver does not know anything about the frame such as the frame type and the buffer set number. If the link control word is not in error and only the information field is in error, the link control word provides the receiver of the damaged frame with enough information to ask the sender to retransmit the damaged frame. Since the information field is usually much longer than the LC, there is a higher chance that a transmission error will affect the information field and not the LC. This means that the most transmission errors affecting a frame can be retried using the information supplied by the link control word. This situation is illustrated in FIG. 7 which shows a write operation with an error in MCB (702). The recipient detects the error and sends a Reject (REJ) 704 frame back to the originator in which a request is made to retransmit the MCB. The originator resends MCB (706).

Figure 8:
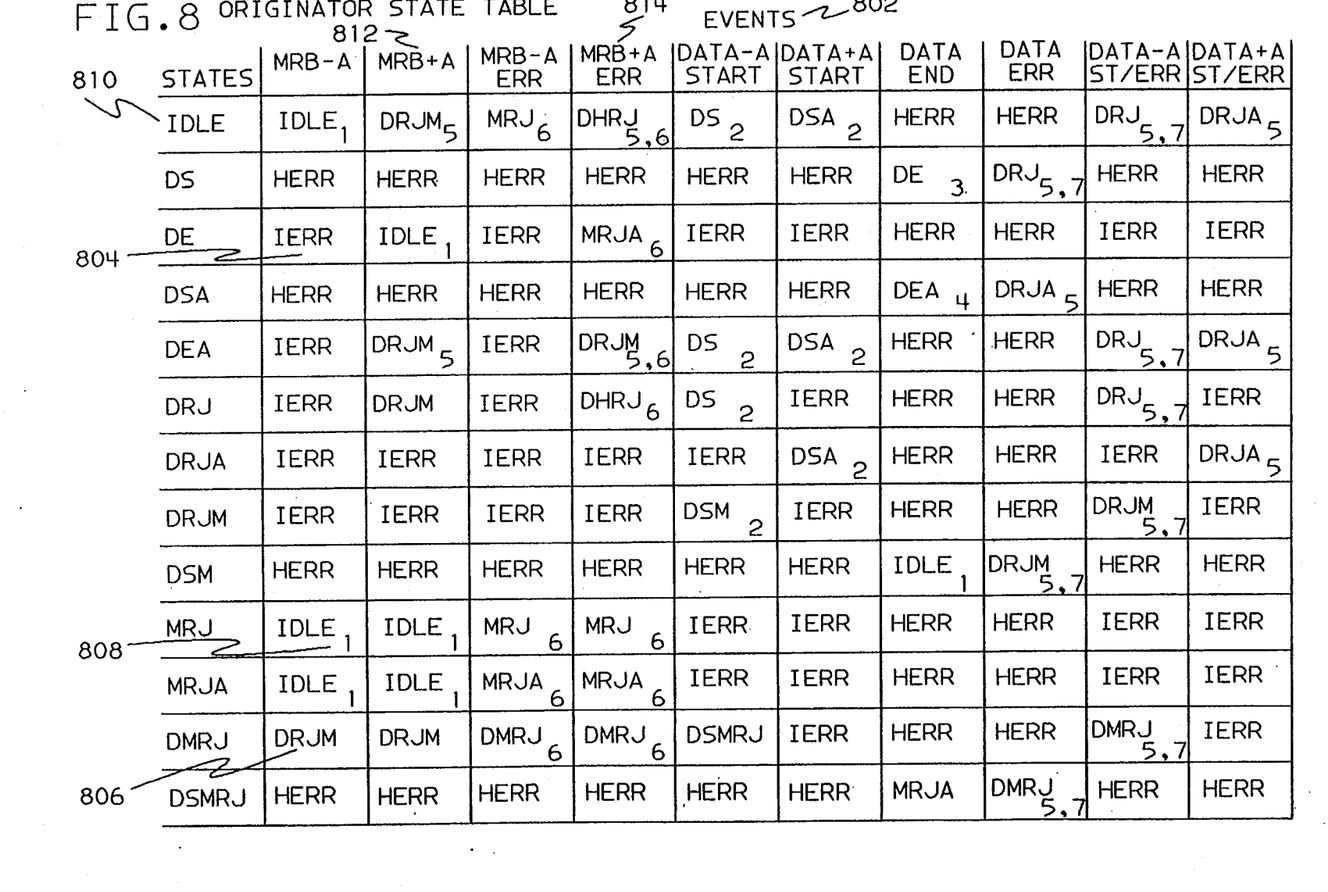
FIG. 8 illustrates the frame reception state table for the originator of an operation.
Figure 12:
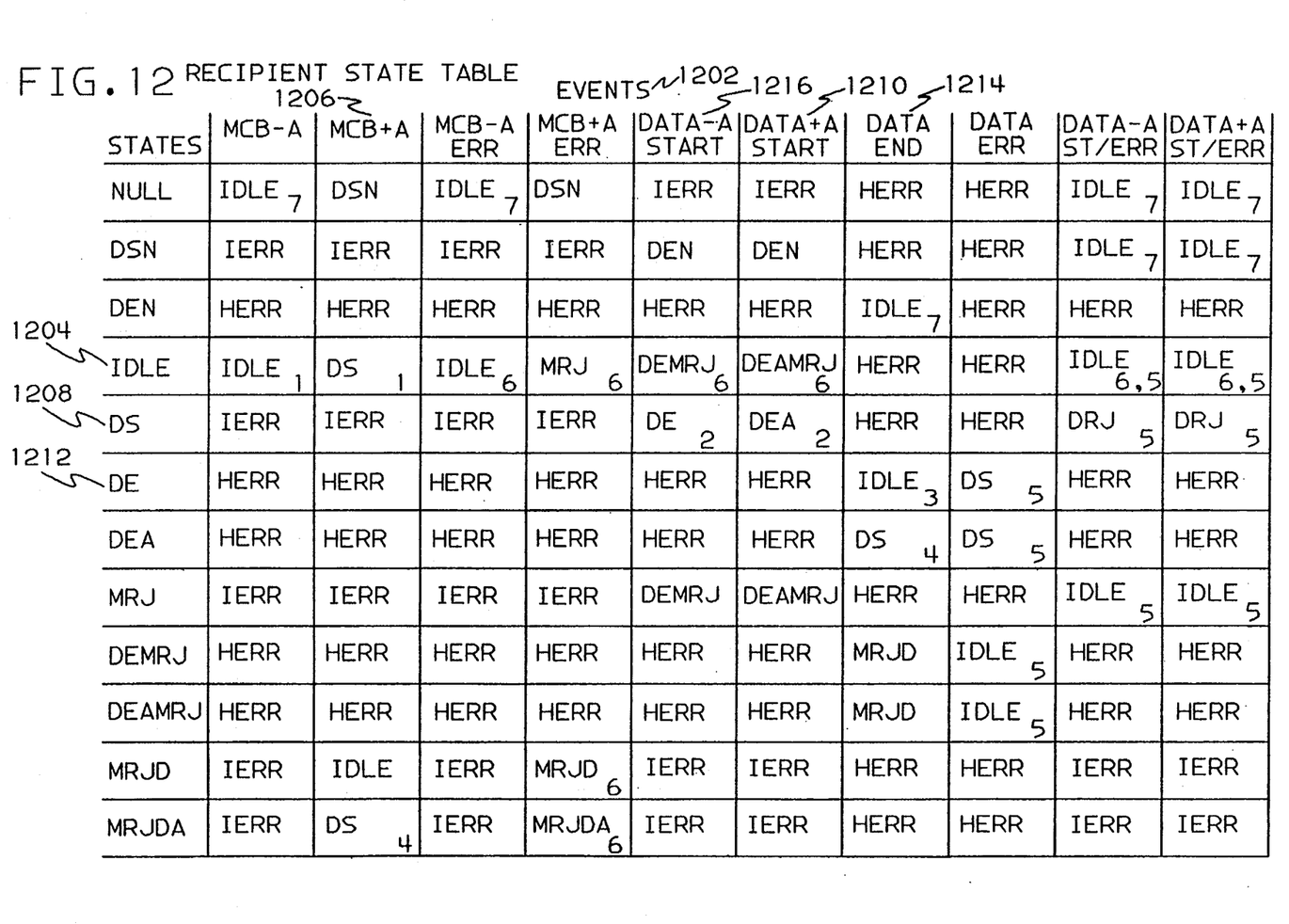
FIG. 12 illustrates the frame reception state table for the recipient of an operation.

The state tables used for receiving frames for the originator and recipient are shown in FIGS. 8 and 12 respectively. Each buffer set maintains its own individual state. The events are listed along the top (802 and 1202 of the tables) and the originator and recipient events are described in FIGS. 10 and 14 respectively. These events are activity on the inbound link. For example, the receipt of an MRB with the "A bit" set to a "1" and no transmission errors is called MRB+A (1002). Because data area frames are much longer than MCB and MRB frames, the receipt of the link control word of these data area frames (DATA−A START 1004 and DATA+A START 1006) is an event allowing the channel to start moving the information field before all of the data area has been received thus improving performance. Listed along the left side of the state tables for FIGS. 8 and 12 are the states. The originator and recipient states for FIGS. 8 and 12 are described in FIGS. 11 and 15 respectively. For example IDLE state 1102 indicates that the originator is done with the previous operation and is ready to receive data areas and the response to the next operation. The IERR state 1104 indicates that an invalid sequence of frames was received, and the HERR state 1106 indicates that the hardware must be in error for the event to occur at this time.

Within each block 804 of the state tables there are two areas. The top of the block indicates the next state (806), and the bottom of the block indicates the action(s). The originator actions are described in FIG. 9, and the recipient action are described in FIG. 13. For example, originator action #2 (902 in FIG. 9) starts data transfer as a result of receiving the link control word of a data area.

All of the sequences shown in FIGS. 5, 6 and 7 can be traced in the state tables in FIGS. 8 and 12. For example, the operation of the recipient during the single data area write case shown in FIG. 5 can be traced in the recipient state table in FIG. 12. The recipient is normally in the IDLE state (1204) waiting for an MCB 510 frame. The arrival of this frame is the MCB+A (1206) event, and the state changes to DS where the recipient is waiting for a data area. The DATA−A START event (1216) signals beginning of DATA frame 512, and the recipient moves to the DE 1212 state waiting for the end of the data area (DE entry in FIG. 12). The DATA END event (1214) signals the successful receipt of the entire data area, and the recipient returns to the IDLE state.

As can be seen in all the examples in FIGS. 5, 6 and 7, a reject may be sent for the last frame (the MRB) of an operation any time after the MRB is sent and before the MCB is sent for the next operation. In practice, when the recipient sends the MRB, its information field is stored in a buffer but the contents of the LC is only known to the recipient while it is actually sending the MRB. If a Reject for the MRB is received later, the recipient can resend information field but has no knowledge of the state of the A bit in the LC. There are two solutions to this problem. The most obvious solution is to have the recipient store the state of the A bit in its main store and use this indicator if it is requested to resend the MRB. This solution requires extra steps in the transmission of every MRB and thus slows down every operation. The better solution is to have the originator register this bit if the information field of the MRB is in error. This moves the overhead of remembering the A bit from the normal error free case to the more uncommon error case.

Returning to FIG. 8, the states in the originator are designed to keep track of the A bit of a damaged MRB. For example, if the originator is in the IDLE state and a damaged MRB with the A bit set to zero is received (MRB−A ERR), the originator sends a Reject for the MRB (action 6) and goes to the MRJ state. In the MRJ state, the originator is waiting for the resent MRB. When the resent MRB is received (MRB−A or MRB+A) the A bit is ignored and the originator returns to the IDLE state. Another example is the receipt of a data area followed by the receipt of a damaged MRB. In this case, the originator steps from the IDLE state to the DS (data start) state to the DE (data end) state. In the DE state, a damaged MRB with the A bit set to one is received (MRB+A ERR). The originator remembers that the A bit is on in the MRB by going to the MRJA state. This state indicates that a damaged MRB with the A bit set to one was received and that a Reject for this damaged frame was sent. In the MRJA state, the A bit in the retransmitted MRB is ignored (MRB−A or MRB+A) and the originator returns to the IDLE state.

Although not explicitly shown in the state tables, other information in the LC of damaged frames may be retained by the receiver. For example, after the recipient sends the last data area for a read operation, a copy of the information field may be left in main store, but the block count and A bit is not retained. If a Reject is sent for this DATA frame, it is useful for the recipient to resend the frame without knowledge of the block count and the A bit. The originator could keep track of this information in the same way as it does for the resent MRB case.

The A bit in the MCB and the write DATA frames could also be retained by the recipient during recovery of these frames, but a performance improvement may not be realized since the originator is actively engaged in the operation until all recovery has been completed and the MRB has been received. Lastly, retaining the block count in the MCB and MRB would be required if these counts were variable. In the present embodiment, these counts are always one.

While we have described our preferred embodiments of our invention, it will be understood that those skilled in the art, both now and in the future, may make various improvements and enhancement which fall within the scope of the claims which follow. These claims should be construed to maintain the proper protection for the invention first disclosed.

The invention claimed is:

1. A method for transmitting information bearing frames from a first location to a second location, said method of transmitting comprising the steps of:
   transmitting an information frame having a header field and an information field, said header field having an indicia therein indicating that related data was previously transmitted;
   storing said indicia at said second location;
   determining, at said second location, that the information field in said transmitted frame is corrupt;
   sending a request for retransmission of said corrupted frame to said first location;

resending said previously corrupted frame from said first location to said second location with at least a portion of said header field being undefined;

upon receipt of said retransmitted frame at said second location, determining, based on said stored indicia, that at least one portion of said newly received header field is to be replaced by said stored indicia; and replacing said at least one portion of said newly received header field.

* * * * *